Sept. 23, 1952     G. O. TURNBULL     2,611,278
ADJUSTABLE PULLEY

Filed Dec. 26, 1947     2 SHEETS—SHEET 2

INVENTOR.
Glen O. Turnbull
Paul O. Pippel
Atty.

Patented Sept. 23, 1952

2,611,278

UNITED STATES PATENT OFFICE 2,611,278

ADJUSTABLE PULLEY

Glen O. Turnbull, Rock Island, Ill., assignor to International Harvester Company, a corporation of New Jersey Application December 26, 1947, Serial No. 793,931

1 Claim. (Cl. 74—230.17)

This invention relates to a new and improved adjustable pulley.

A principal object of this invention is to provide a pulley especially adapted for V-belts and having means incorporated therein for adjustable spacing of the walls of the pulley to effect variable shaft driving speeds by changing the pitch diameter of the belt.

An important object of this invention is the provision of a two-part adjustable V-belt pulley having means therein for adjustably spacing the two parts and separate means for imparting rotative drive from one part to the other part of the pulley.

Still another important object of this invention is to provide a simple adjustable V-belt pulley employing a minimum of working parts with maximum drive strength in any of the infinite openings of the pulley.

Other and further important objects of this invention will become apparent from the disclosures in the following specification and accompanying drawings in which.

Figure 1:
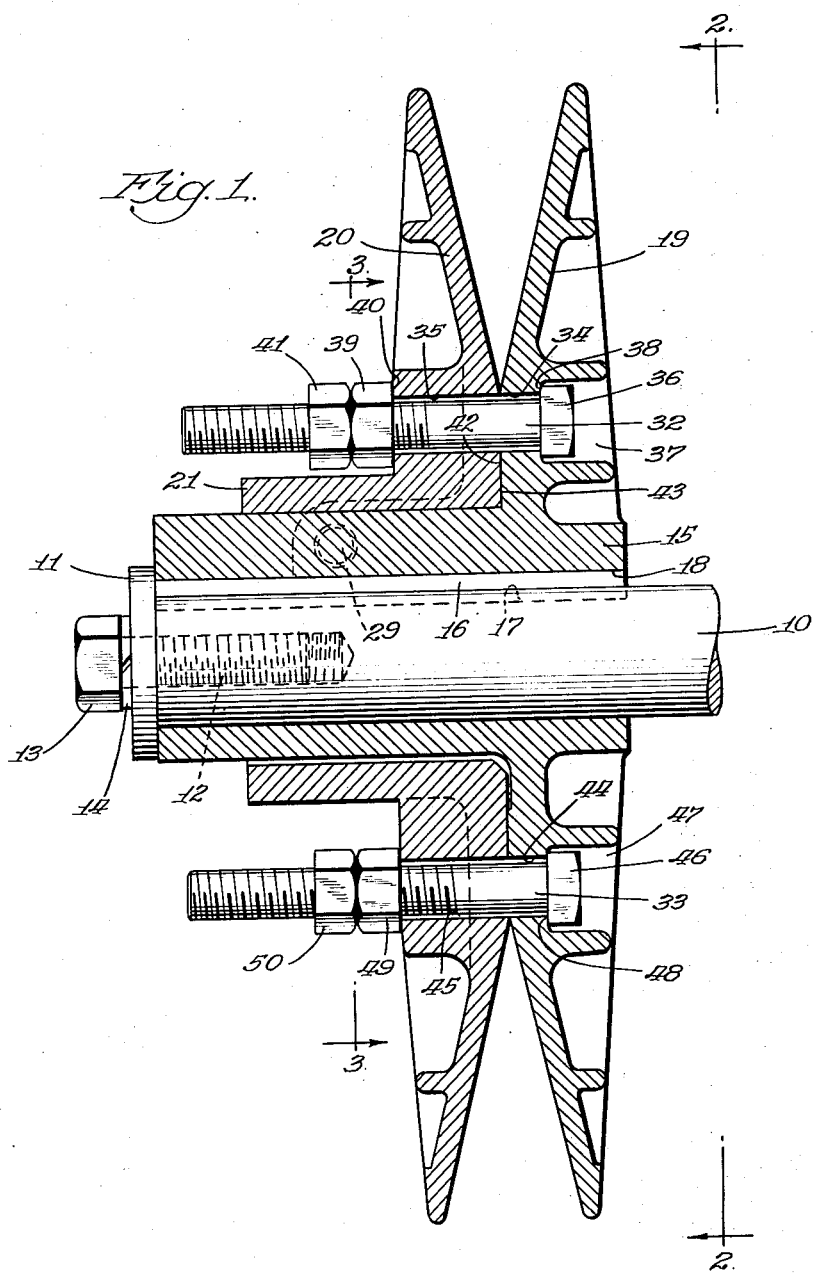
Fig. 1 is a vertical sectional view taken through the adjustable pulley of this invention.
Figure 2:
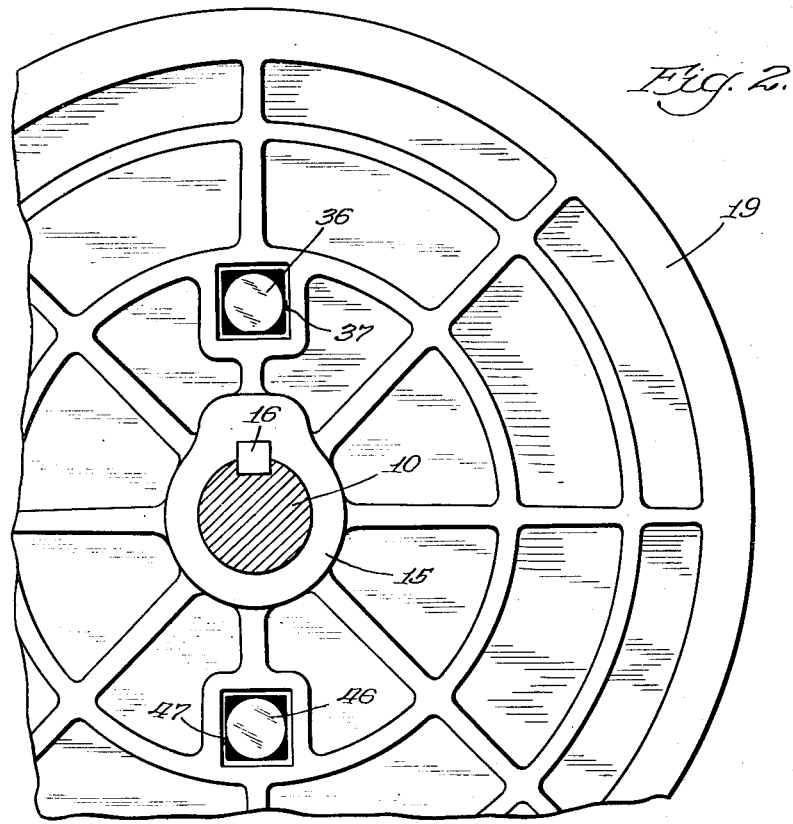
Fig. 2 is a side elevational view of the pulley as viewed from line 2—2 of Fig. 1.

As shown in the drawings, the reference numeral 10 indicates generally a shaft on which is mounted the adjustable pulley of this invention. One end of the shaft 10 is provided with a collar 11 held in fixed position by means of a threaded bolt 12 having an enlarged head 13 engaging a lock washer 14 which bears directly on the collar 11. The bolt 12 has threaded engagement with the shaft 10.

The pulley is provided with an internal hub 15 mounted on the shaft 10 and held in fixed rotative relationship with the shaft by means of a key 16 extending within the opposed aligned keyways 17 and 18 in the shaft 10 and the hub 15. One-half section 19 of the pulley is integrally associated with the hub 15. A section 20 complements the section 19 and completes the V-belt pulley. The section 20 of the pulley has an external hub 21 slidable over the hub 15 of the pulley section 19.

Figure 3:
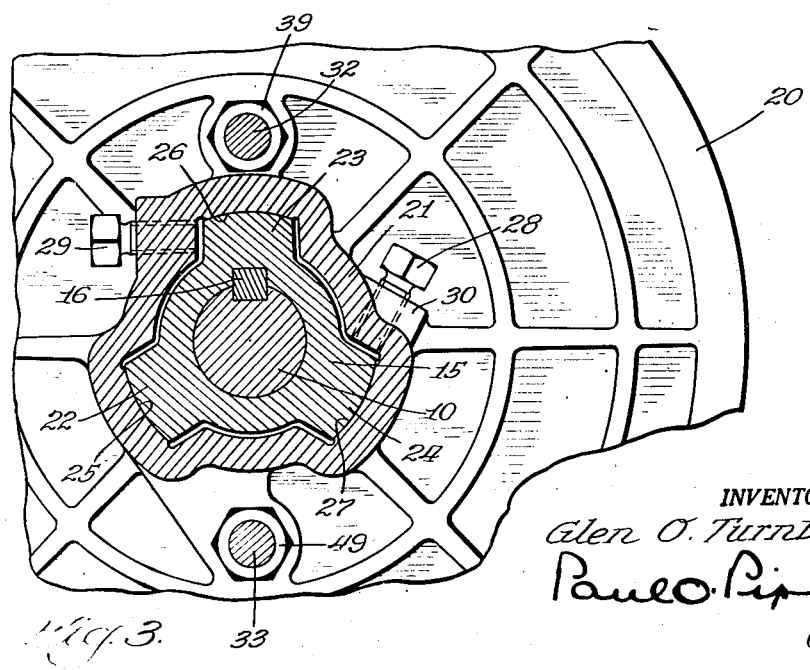
Fig. 3 is a sectional view taken on the line 3—3 of Fig. 1.

As best shown in Fig. 3 the hub 15 is substantially triangular in shape and has three apices 22, 23, and 24. The external sleeve hub 21 of the pulley section 20 is also substantially triangular in its internal shape and has three internal apices 25, 26, and 27. Rotational drive from the shaft 10 is thus transmitted outwardly to the hub 15 through the key 16 and from the apices of the hub 15 to the similar apices of the sleeve hub 21. The pulley sections 19 and 20 thus move as a unit, and complete drive is accomplished through the triangular sleeve hub 21 telescoped over the triangular hub 15. Set or locking screws 28 and 29 threadedly engage bosses 30 and 31 in the sleeve hub 21. The screw 28 is adapted to pass through the boss 30 and contact the apex 24 of the triangular hub 15. Similarly, the screw 29 passes through the boss 31 and engages the apex 23 of the triangular hub 15. When these two set screws 28 and 29 are turned up tightly, relative movement between the triangular hubs 15 and 21 is not permitted.

The pulley sections 19 and 20 as shown in Fig. 1 abut each other at their hub ends. One of the prime objects of this invention is the lateral adjustability of one section of the pulley with respect to the other section of the pulley to effect variable speed drive by causing the belt to ride in the pulley either at a position near the outer periphery or at some position between the outer periphery and the hub by proper spacing of the pulley sections. The pulley sections or parts 19 and 20 are held together by two bolts 32 and 33. The bolt 32 passes through aligned apertures 34 and 35 in the pulley sections 19 and 20 respectively. The bolt head 36 is positioned within a square recess 37 in the outer surface of the pulley section 19. The square head 36 engages a shoulder 38 at the outer end of the passage 34, thus holding the bolt 32 in position. A nut 39 engages the outer end of the shank of the bolt 32 and is drawn up against the outer wall 40 of the pulley section 20. A second nut 41 threadedly engages the bolt 32 and is drawn up against the nut 39, locking it in fixed position. As previously stated as shown in Fig. 1, the pulley sections are adjusted for the tightest belt position with the inner surface 42 of the pulley section 20 abutting the inner surface 43 of the pulley section 19. Similarly to the structure adjacent the bolt 32 the bolt 33 passes through aligned passages or apertures 44 and 45 and is equipped with a square head 46 positioned within a square recess 47. The head engages a shoulder 48 and a pair of nuts 49 and 50 lock the pulley sections in fixed spaced position. When it is desired to space the section 20 away from the section 19, the nuts 41 and 50 are withdrawn from their abutting positions with respect to the nuts 39 and 49 respectively. The next step is to withdraw the nuts 39 and 49 from their position engaging the outer face 40 of the pulley section 20. The set screws 28 and 29 are loosened and the pulley section 20 may now be shifted laterally with respect to the pulley section 19 a distance determined by the withdrawn position of the nuts 39 and 49.

When the desired spacing of the pulley sections is obtained the set screws 28 and 29 are retightened and the lock nuts 41 and 50 are drawn up against the nuts 39 and 49. The action of a V-belt within the pulley tends to spread the sections 19 and 20 so that there is a minimum of tendency for the sections 19 and 20 to travel toward each other. Such a tendency is further overcome by the set screws 28 and 29, which, although primarily compensate for relative rotational movement between the hubs 15 and 21, also limit relative lateral shifting of the hubs 15 and 21. The pulley spacing bolts 32 and 33 do not receive any of the torsional driving strain and thus are always readily adjustable.

The pulley of this invention is adapted for use in variable speed arrangements wherein it is desired to change the pitch diameter of the pulley. As a rule two such adjustable pulleys are used at opposite ends of a V-belt whereby upon adjustment of both pulleys simultaneously and oppositely the length of the belt remains constant but the driving ratio between the two pulleys is changed.

I am aware that many details of construction may be varied over a wide range without departing from the principles disclosed herein, and I therefore do not propose limiting the patent granted hereon otherwise than as necessitated by the appended claim.

What is claimed is:

An adjustable V-belt pulley comprising adjacent pulley side sections, each of said side sections having integral hubs, said hubs both extending laterally in the same direction, the first of said hubs having a shaft engaging opening and an external substantially triangular shape, the second of said hubs having an internal opening corresponding in shape to the external substantially triangular shape of the first hub, said second hub positioned over and around said first hub and permitting lateral sliding movement of the pulley side sections with respect to each other and causing concurrent rotation of the pulley side sections, bolt means passing through the adjacent pulley side sections spaced outwardly of said hubs for adjustably joining said adjacent pulley side sections in any desired lateral spacing, and set screws positioned in said second hub and passing therethrough to abutting engagement with the first hub whereby all relative rotative motion between the two hubs is eliminated.

GLEN O. TURNBULL.

REFERENCES CITED

The following references are of record in the file of this patent:

UNITED STATES PATENTS

| Number | Name | Date |
|---|---|---|
| 661,970 | Garland | Nov. 20, 1900 |
| 1,180,867 | Milne | Apr. 25, 1916 |
| 1,740,087 | Hall | Dec. 17, 1929 |
| 2,101,084 | Meyers | Dec. 7, 1937 |
| 2,135,214 | Moore | Nov. 1, 1938 |
| 2,180,217 | Thomas | Nov. 14, 1939 |
| 2,209,737 | Livingston | July 30, 1940 |
| 2,248,948 | Bowers | July 15, 1941 |
| 2,327,122 | Mehlman | Aug. 17, 1943 |

FOREIGN PATENTS

| Number | Country | Date |
|---|---|---|
| 23,700 | Great Britain | 1912 |